United States Patent [19]
Sakai et al.

[11] Patent Number: 5,943,094
[45] Date of Patent: Aug. 24, 1999

[54] IMAGE PICKUP DEVICE WITH NOISE DATA GENERATION

[75] Inventors: Shinji Sakai; Nobuo Fukushima, both of Yokohama; Akira Suga, Tokyo, all of Japan

[73] Assignee: Canon Kabushiki Kaisha, Tokyo, Japan

[21] Appl. No.: 08/929,659

[22] Filed: Sep. 17, 1997

Related U.S. Application Data

[60] Continuation of application No. 08/479,115, Jun. 7, 1995, abandoned, which is a division of application No. 08/322,400, Oct. 12, 1994, abandoned, which is a continuation of application No. 07/939,603, Sep. 2, 1992, abandoned.

[30] Foreign Application Priority Data

| Sep. 4, 1991 | [JP] | Japan | 3-223830 |
| Sep. 4, 1991 | [JP] | Japan | 3-223831 |
| Aug. 28, 1992 | [JP] | Japan | 4-253987 |

[51] Int. Cl.[6] .................................................. H04N 9/64
[52] U.S. Cl. ...................................... 348/243; 348/244
[58] Field of Search .................................. 348/241, 242, 348/243, 244, 245, 248, 249, 250; H04N 9/64

[56] References Cited

U.S. PATENT DOCUMENTS

| 4,558,366 | 12/1985 | Nagumo | 348/248 |
| 4,723,170 | 2/1988 | Jaspers | 348/243 |
| 4,760,453 | 7/1988 | Hieda | 348/244 |
| 4,839,729 | 6/1989 | Ando et al. | 348/241 |
| 5,376,966 | 12/1994 | Takase | 348/243 |

*Primary Examiner*—Tuan V. Ho
*Attorney, Agent, or Firm*—Robin, Blecker & Daley

[57] ABSTRACT

An image pickup device including: a solid state image pickup element; a memory; an image pickup data generating unit for generating image pickup data through an image pickup operation of reading data from the solid state image pickup element and A/D converting the data; a first processing unit for storing the image pickup data in the memory; a noise data generating unit for generating noise data through an operation, similar to the image pickup operation in a non-exposure state, of reading data from the solid state image pickup element and A/D converting the data; and a second processing unit for generating a desired image pickup data by subtracting an average data of a plurality of noise data obtained by a plurality of repetitive operations of the noise data generating unit, from the image pickup data stored in the memory means.

24 Claims, 8 Drawing Sheets

IMAGE PICKUP DEVICE WITH NOISE DATA GENERATION

This is a continuation application under 37 CFR 1.62 of prior application Ser. No. 08/479,115, filed Jun. 7, 1995, abandoned; which is a divisional of Ser. No. 08/322,400, filed Sep. 12 1994, abandoned; which is a continuation of Ser. No. 07/939,603, filed Aug. 2, 1992, abandoned.

BACKGROUND OF THE INVENTION

1. Field of the Invention

The present invention relates to an image pickup device of an electronic still camera (also called a still video camera) or the like using a solid state image pickup element such as a CCD, and more particularly to a noise suppression technique.

2. Related Background Art

In order to suppress noises of an image pickup device of an electronic still camera, a method is known whereby an image signal outputted from the image pickup device is subtracted by a signal obtained when the image pickup device is light-shielded, to thereby reduce fixed pattern noises in each frame.

Such a method can suppress fixed pattern noises, but random noises are multiplied by 1.4 or a root 2. Furthermore, noises are extracted in a manner similar to the image taking operation, near at the time before or after an image is taken, resulting in a poor operation speed of continuous image taking of a camera.

The present invention has been made under such circumstances. It is an object of the present invention to provide an image pickup device capable of reducing fixed pattern noises without increasing random noises.

Apart from the above, in order to deal with a defective pixel of a CCD, data of a pixel one pixel before the defective pixel has been conventionally replaced with that of the defective pixel.

Such a conventional method allows a replacement of a preceding signal with a succeeding signal because of the order of reading pixels of a CCD. However, it is difficult to replace a succeeding signal with a preceding signal. Some images have a strong correlation in the vertical direction. In such a case, it is preferable to replace the signal of a defective pixel with that of a pixel at the upper or lower row. However, a conventional method is not suitable for such correction.

SUMMARY OF THE INVENTION

According to the present invention, an image pickup device has one of the following structures (1) to (6) in order to suppress random noises.

(1) An image pickup device comprising image pickup means for receiving light from a subject and photo-electrically converting the received light; exposure control means for controlling the amount of incident light to the image pickup means; and noise data generating means for generating predetermined noise data in accordance with an image pickup output from the image pickup means when the image pickup means is shielded from light by the exposure control means, the noise data generating means generating the predetermined noise data by using a plurality of noise data obtained through a plurality of read operations by the image pickup device light-shielded by the exposure control means.

(2) An image pickup device comprising a solid state image pickup element; memory means; image pickup data generating means for generating image pickup data through an image pickup operation of reading data from the solid state image pickup element and A/D converting the data; first processing means for storing the image pickup data in the memory means; noise data generating means for generating noise data through an operation, similar to the image pickup operation in a non-exposure state, of reading data from the solid state image pickup element and A/D converting the data; and second processing means for generating a desired image pickup data by subtracting an average data of a plurality of noise data obtained by a plurality of repetitive operations of the noise data generating means, from the image pickup data stored in the memory means.

(3) An image pickup device as recited in the structure (2), wherein the second processing means generates the desired image pickup data by generating one integer-number-th of the noise data and subtracting the one integer-number-th of the noise data from the image pickup data stored in the memory means the integer-number times.

(4) An image pickup device as recited in the structure (2), further comprising temperature detecting means for detecting a temperature of the solid state image pickup element and first control means for controlling the operation of the second processing means in accordance with an output from the temperature detecting means.

(5) An image pickup device as recited in the structure (2), further comprising second control means for controlling the operation of the second processing means in accordance with a signal accumulation time of the solid state image pickup element.

(6) An image pickup device as recited in the structure (2), further comprising third control means for controlling the operation of the second processing means in accordance with a camera operation mode.

With the structures (1) to (6), an average of a plurality of noise data is subtracted from an image pickup data to obtain a desired image data with noises being reduced. With the structure (4), the operation of reducing noises is controlled in accordance with a temperature of a solid state image pickup element. With the structure (5), the operation of reducing noises is controlled in accordance with a signal accumulation time of a solid state image pickup element. With the structure (6), the operation of reducing noises is controlled in accordance with a camera operation mode.

According to the present invention, a video camera has one of the following structures (1) to (3) in order to deal with a defective pixel.

(1) A video camera comprising a solid state image pickup element; A/D conversion means for converting a signal read by the solid state image pickup element into a digital signal; first memory means for storing the digital signal; second memory means for storing an address of a defective pixel of the solid state image pickup element; interpolating pixel address determining means for determining the address of an interpolating pixel in accordance with the address of the defective pixel, the interpolating pixel being used for the interpolation of the defective pixel; and interpolating means for reading data of the interpolating pixel from the first memory means in accordance with the address of the interpolating pixel, generating interpolating data for the defective pixel in accordance with the data of the interpolating pixel, and interpolating data of the defective pixel.

(2) A video camera as recited in the structure (1), wherein the interpolating means interpolates the data of the defective pixel by replacing the data of the defective pixel in the first memory with the interpolating data.

(3) A video camera as recited in the structure (1), wherein the interpolating means interpolates by replacing the data of the defective pixel with the interpolating data, on a buffer memory dedicated for data reproduction.

With the structures (1) to (3), data of a defective pixel is replaced with interpolation data generated basing upon the data of an interpolating pixel at an optional address. With the structure (2), the interpolation is carried out on the first memory means. With the structure (3), the interpolation is carried out on a buffer memory provided for reproduction.

The other objects and advantages of the present invention will become apparent from the following detailed description of the embodiments when read in connection with the accompanying drawings.

DETAILED DESCRIPTION OF THE PREFERRED EMBODIMENTS

Preferred embodiments of the present invention will be described in detail.

Figure 1:
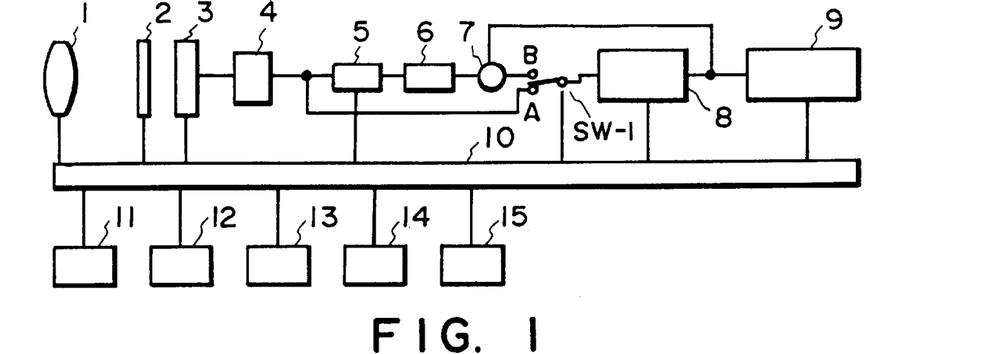
FIG. 1 is a block diagram showing an image pickup device of a first embodiment according to the present invention.

FIG. 1 is a block diagram showing an electronic still camera according to the first embodiment. In FIG. 1, reference numeral 1 represents a lens, reference numeral 2 represents a shutter, reference numeral 3 represents a solid state image pickup element, reference numeral 4 represents an A/D converter, reference numeral 5 represents an N-bit shift circuit (N is an integer, also applied to Ns at following occurrences in the specification), reference numeral 6 represents a sign inversion (multiplying by−1) circuit, reference numeral 7 represents an adder, reference numeral 8 represents a memory, reference numeral 9 represents a signal processing/recording circuit, and reference numeral 10 represents a camera control circuit including a power source system. Reference numerals 11 to 15 represent circuits used with the camera control circuit 10. Reference numeral 11 represents a photometry circuit for measuring a brightness of a subject, reference numeral 12 represents a temperature detecting circuit for detecting a temperature of the solid state image pickup element, reference numeral 13 represents manipulation means such as a release button, reference numeral 14 represents display means such as a liquid crystal and LED, and reference numeral 15 represents a power source voltage detecting circuit.

The overall operation of the electronic still camera will first be described.

The camera control circuit 10 judges a user intention from a signal given from the release button 13, and if necessary, it causes the power to turn on. Then, necessary data is collected from the photometry circuit 11, temperature detecting circuit 12, power source voltage circuit 15 and signal processing/recording circuit 9 to display it on the display means 14.

When a user provides a release instruction under the photograph enable state, the camera control circuit determines an aperture value, shutter speed and the like in accordance with the photometric operation results, and controls the lens 1, shutter 2, solid state image pickup element 3 and the like to take a subject image. Data read from the solid state image pickup element 3 is converted into digital data (image pickup data) by the A/D converter 4, the digital data being stored in the memory 8 when a switch SW-1 is turned to the A side by an instruction from the camera control circuit 10.

Thereafter, the solid state image pickup element 3 is made active again while closing the shutter 2.

An output of the solid state image pickup element 3 is A/D converted. This digital data is shifted to the lower digit by N bits determined by the camera control circuit 10. The sign of this shifted data is inverted by the sign inversion circuit 6, and the resulting data is added to an output of the memory 8 and stored in the memory 8 via the B contact of the switch SW-1 (i.e., an output of the memory 8 is subtracted by the shifted data).

This operation is repeated by 2 raised to power-of-N times. Therefore, the final data stored in the memory 8 is the original image data subtracted by 1/(2 raised by power-of-N) of the black data (noise data) 2 raised to power-of-N times.

Thereafter, the camera control circuit 10 causes the signal processing/recording circuit 9 to process the final data from the memory 8 and record it.

The numeral N may be set to an optional value. Generally, it is sufficient that N is set to 2 since the black data is averaged four times and the noise random components are approximately halved.

As described above, in this embodiment, the image data first stored in the memory 8 is subtracted by 1/(2 raised by power-of-N) of the noise data 2 raised to power-of-N times. Namely, the image data first stored in the memory 8 is subtracted by average data of noise data picked up a plurality of times. It is therefore possible to obtain desired image pickup data with reduced fixed pattern noises without increased random noises.

The camera control circuit 10 determines from the system conditions the value of N and determines whether noises should be suppressed or not. Specifically, if the signal accumulation period of the solid state image pickup element is long and the environmental temperature is high, it can be considered that fixed pattern noises are large. In this case, sufficient noise suppression is required. On the other hand, if a power source (battery) condition is poor and so there is a high possibility of an inability to take an image, or if an image taking operation continues for a short time as in the case where a high speed continuous image taking is intended, then noise suppression may be simplified or omitted.

In the first embodiment, only one memory 8 is used. If it is impossible to read data from and write data into the memory 8 within an allowable time period because of the limitation of access time (or cycle time), then another method must be taken, on condition that the memory 8 has a bit length covering the N bits necessary for the above operation.

Figure 2:
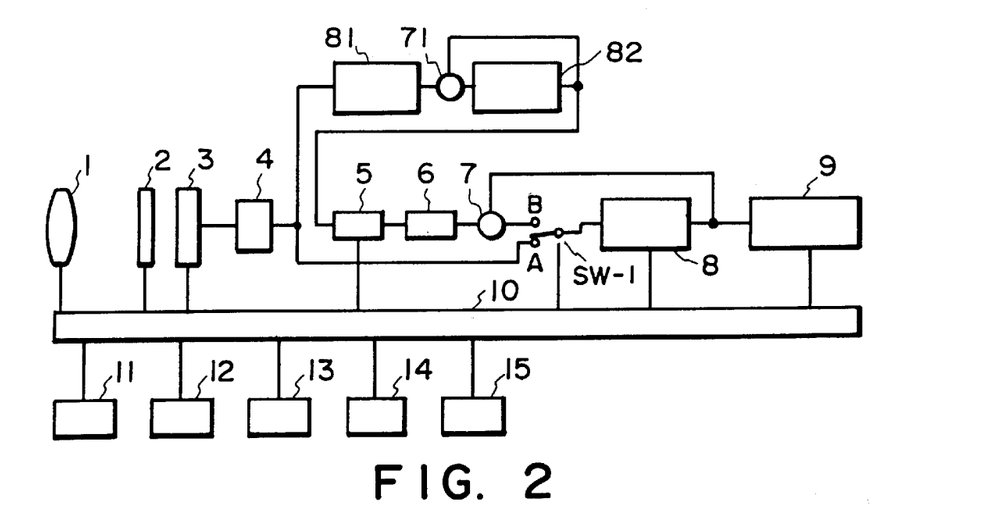
FIG. 2 is a block diagram showing an image pickup device of a second embodiment according to the present invention.

In the second embodiment as shown in FIG. 2, a memory 8 same as the first embodiment, as well as memories 81 and 82 having the bit length equal to or less than that of the memory 8, is used.

In this embodiment, a subject image is taken and stored in the memory 8 in the manner like the first embodiment. Thereafter, noise components picked up at the first cycle are stored in the memory 81 and then transferred to the memory 82 during the second cycle. Noise components picked up at the second cycle are stored in the memory 81 and added by an adder 71 to the noise components picked up at the first cycle and stored in the memory 82 during the third cycle. In this manner, noise components can be accumulated at a speed slower than the operation speed of the memory 8.

If the memory 82 can read data from and write data into the memory 82 within a time period compatible with the read speed of the solid state image pickup element 3, the memory 81 is not necessary. In this case, noise components can be accumulated at each read cycle of the solid state image pickup element 3, by using only the memory 82.

A sum of noises picked up 2 raised by power-of-N times is finally stored in the memory 82. This noise signal is smaller than the subject image signal and does not saturate any circuit in concern.

The total value of the noise components picked up 2 raised by power-of-N times is shifted by N bits to the lower digit in the manner like the first embodiment, and this shifted value is subtracted from the image signal stored in the memory 8. This operation may be carried out at a lower speed since both the necessary values have been already stored in the memories 82 and 8.

Also in this embodiment, a plurality of noise data are added together, and the resultant data is shifted to the lower digit, to thereby calculate an average of noise data. In this manner, like the first embodiment, an average of a plurality of noise data is subtracted from the image data stored in the memory 8 to obtain desired image data.

Figure 3:
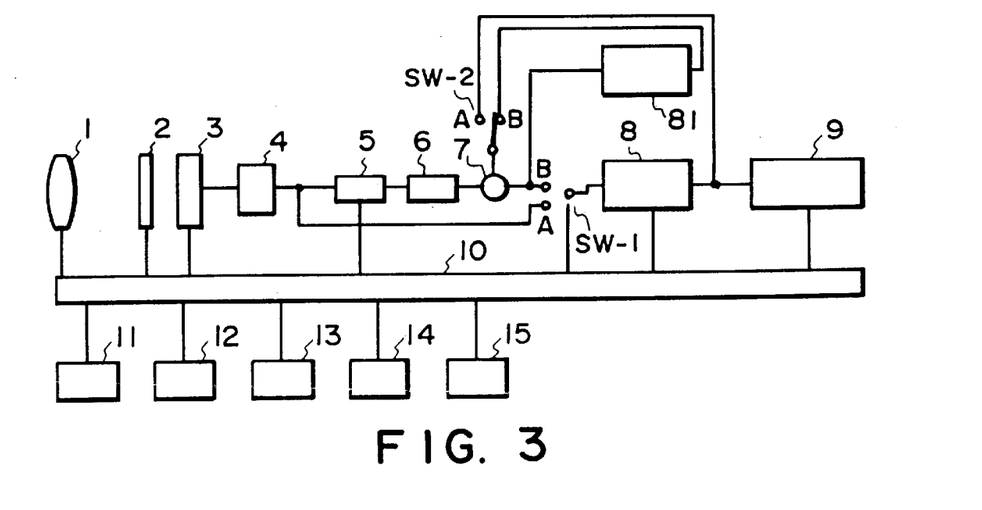
FIG. 3 is a block diagram showing an image pickup device of a third embodiment according to the present invention.

The third embodiment shown in FIG. 3 deals with the case where the memory 8 of the first embodiment has an operation speed problem although it has a sufficient bit length.

A subject image data is read from the memory 8 and applied to the adder 7 at which 1/(2 raised to power-of-N) of the noise data is subtracted from the subject image data. The resulting data is stored in the memory 81. Next, the data stored in the memory 81 is read and subtracted from the next noise data, the resulting data being stored in the memory 8. This operation is repeated 2 raised to power-of-N times (even times) so that the final result is stored in the memory 8. This final data is supplied to the signal processing/recording circuit 9.

If a camera system has a plurality of available memories, all necessary signals may be stored in individual memories and processed thereafter by a CPU. For a card camera using a card as a memory for recording images, only available memories may be used partially for such an operation.

In the first to third embodiments, the resulting image signal is obtained by subtracting an average of noise data from the original image data. Therefore, in some cases the value of an image signal for a black area takes a zero value or partially a negative value because of random noises. If the signal processing/recording circuit at the succeeding stage is not adapted to process such a negative value, a proper offset value may be added to an average of noise data, such as removing a d.c. component of noise data by means of clamping.

As described above, according to the present invention, large fixed pattern noises caused by high temperature or long image signal accumulation time can be reduced without increasing random noises so much. In addition, a function of continuous image taking of a camera can be retained unchanged.

Another embodiment of the present invention will be described in detail.

Figure 4:
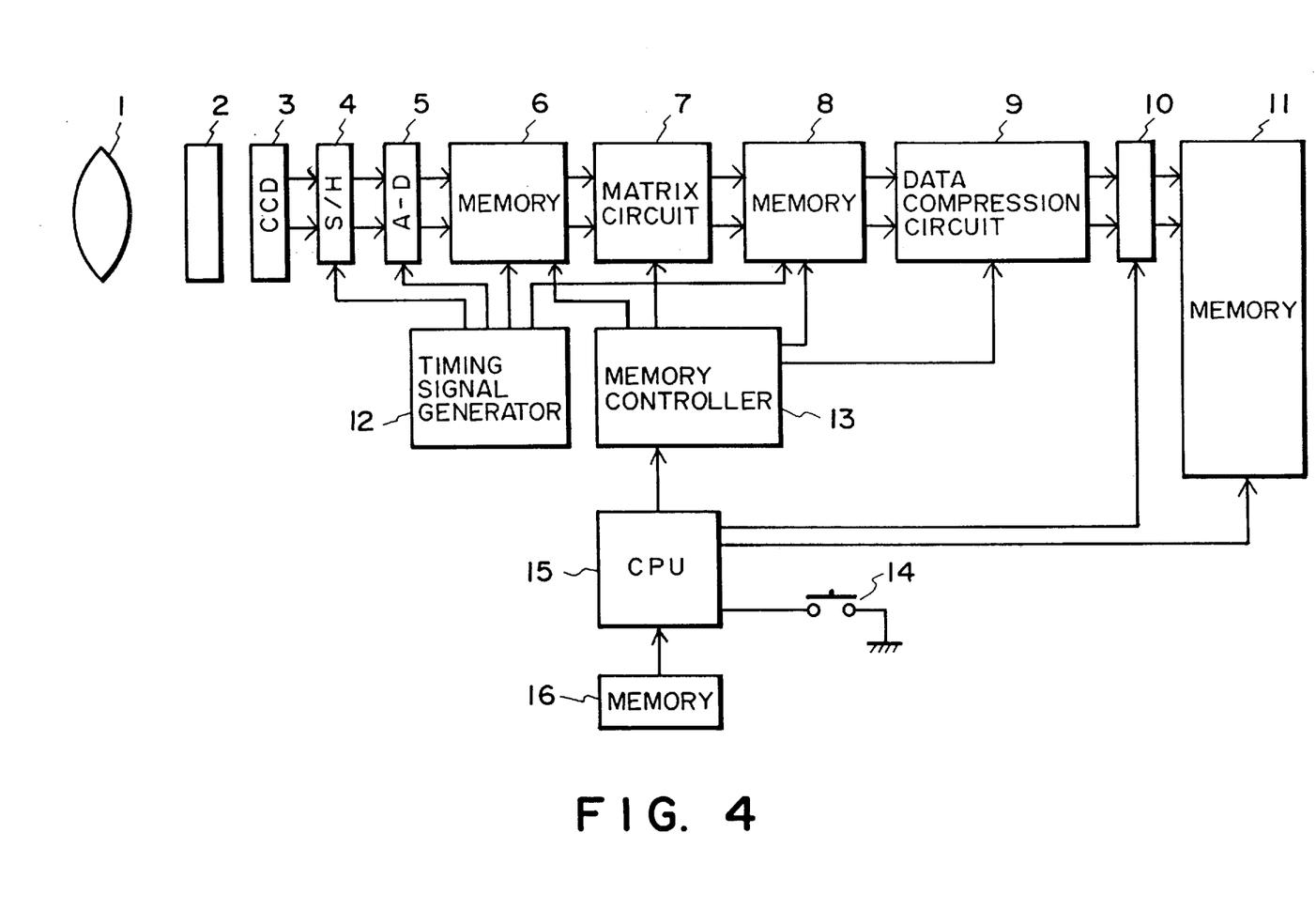
FIG. 4 is a block diagram showing an image pickup device of a fourth embodiment according to the present invention.

FIG. 4 is a block diagram of a still video camera according to an embodiment. In FIG. 4, reference numeral 1 represents a taking lens, reference numeral 2 represents light amount control members including an aperture, shutter and the like, reference numeral 3 represents a solid state image pickup element CCD, reference numeral 4 represents a pre-process circuit for sample-and-hold, gamma correction, and knee correction, reference numeral 5 represents an A/D coverter, reference numeral 6 represents a first memory, reference numeral 7 represents a matrix circuit for generating a luminance signal and color difference signals, reference numeral 8 represents a second memory for storing luminance signals and color difference signals, reference numeral 9 represents a data compression circuit, reference numeral 10 represents an interface circuit to a fourth memory such as a hard disk, memory card, or optical disc, reference numeral 12 represents a timing signal generator for generating a timing signal for driving the solid state image pickup element CCD, a sampling pulse, and an A/D conversion pulse, reference numeral 13 represents a memory controller for respectively controlling a memory read/write operation and the refresh operation of said memories such as a DRAM, reference numeral 14 represents a record trigger switch, reference numeral 15 represents a microcomputer for controlling the system operation such as an image taking sequence, and reference numeral 16 represents a fourth memory, particularly a non-volatile memory such as an EEPROM, for storing addresses of defective pixels of the solid state image pickup element 3, and other data, the contents of this memory being read are written under the control by a microcontroller.

Next, the operation of this embodiment will be described with reference to FIGS. 5 to 7.

Figure 5:
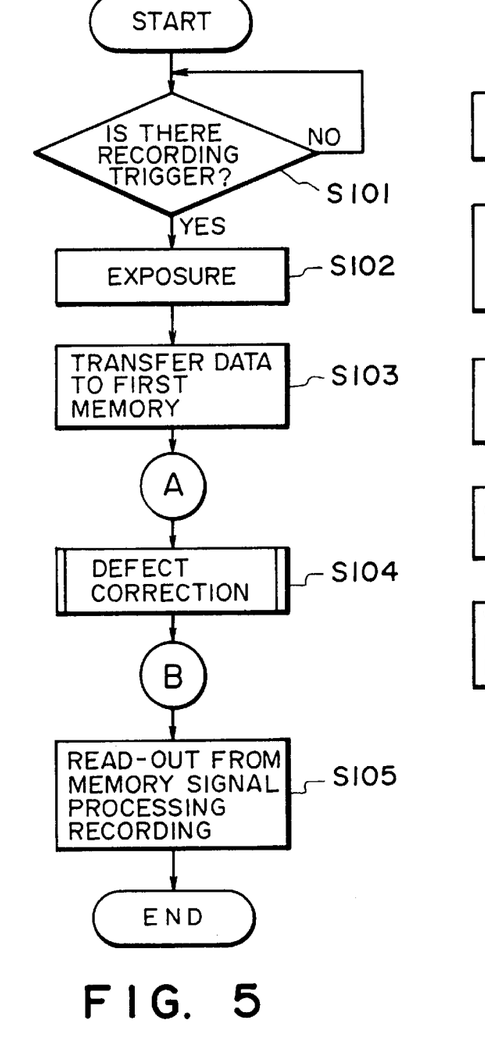
FIG. 5 is a flow chart showing the operation of the embodiment shown in FIG. 4.

FIG. 5 is a flow chart showing the image taking sequence of the embodiment. It is first checked at step S101 whether the record trigger switch 14 has been depressed. If depressed, the image taking sequence proceeds (at step S102 and following steps). At step S102, an exposure operation for the image pickup element is carried out by controlling the shutter, aperture and the like. At step S103, under the control by the memory controller 13, a signal accumulated in the image pickup element 3 is transferred to the first memory 6. At step S104 an interpolation operation is carried out for defective data of the image pickup element, which operation is the gist of the present invention. The details of the interpolation operation will be given with reference to FIGS. 6 and 7.

At step S105, under the control by the memory controller 13, the data in the first memory 6 is transferred to the matrix circuit 7 and stored in the second memory 8, and in the third memory 11 such as a memory card or hard disk via the compression circuit 9 and interface circuit 10. At this time, a basic image taking operation is completed.

The operation at step S104 for interpolation of defective data of the image pickup element, which is the gist of the present invention, will be described with reference to FIG. 7.

Figure 7:
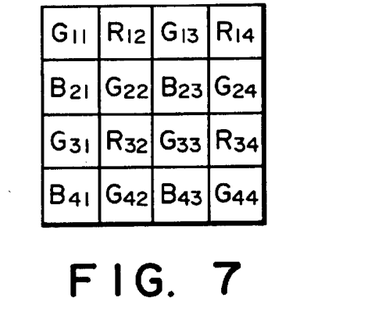
FIG. 7 is a diagram showing an example of a pixel layout.

FIG. 7 shows an example of the pixel layout of the solid state image pickup element 3. Characters R, G, and B in FIG. 7 stand for red, green, and blue colors of color filters for pixels. Suffix numbers represents the position of each pixel on a two-dimensional plane. For example, $R_{12}$ stands for a pixel at the first row and at the second column.

Assuming that the pixel $G_{33}$ is defective, an interpolation for the pixel $G_{33}$ is executed by using for example the pixel $G_{42}$ at the lower left. The following process is executed under the control by the microcontroller 15.

Figure 6:
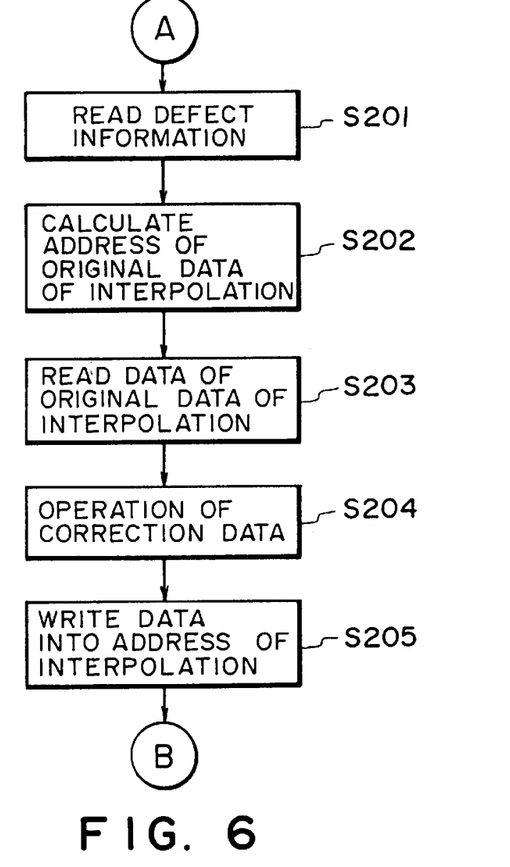
FIG. 6 is a flow chart showing the details of step S104 of the flow chart of FIG. 5.

Referring to the flow chart shown in FIG. 6, at step S201 under the control by the microcontroller 15, address information of the defective pixel, in this case the pixel $G_{33}$, of the image pickup element 3 is read from the non-volatile memory 16. At step S202, the address of the lower left pixel is calculated to use the data of this pixel for the interpolation. This address is an address of the pixel $G_{42}$ data stored in the first memory 6. Next, at step S203 the data for the interpolation use is read from the first memory 6. At step S204 a correction data is calculated using the interpolation data read at step S203. In this case, the interpolation data itself read at step S203 is used as the correction data. At step S205 the correction data obtained at step S204 is written in the first memory 6 at an interpolation destination address (in this case, the address of $G_{33}$).

With the above process, the interpolation operation for the defective data of the image pickup element is completed.

In the above embodiment, only one defective data of the image pickup element is used. Obviously, a plurality of defective data can be interpolated. In this case, the capacity of the non-volatile memory 16 is made sufficient for storing address information of a plurality of defective pixels.

Furthermore, in the above embodiment, only one pixel at the lower left is used for the interpolation of a defective pixel of the image pickup element. The number of pixels to be used for the interpolation is not limited to a single pixel. For example, referring to FIG. 7, for the interpolation of the defective pixel $G_{33}$, addresses of four pixels $G_{22}$ and $G_{24}$ at the upper right and left and $G_{42}$ and $G_{44}$ at the lower right and left are calculated at step S202, and the data of the four pixels is read at step S203. An average of the data of the four pixels is calculated at step S204, and written in the memory 6 at the address of the defective pixel G33 at step S205.

Still further, in the above embodiment, the address of a defective pixel of the image pickup element 3 is stored in the fourth memory 16. Instead, the address of a defective pixel of the image pickup element may be stored in the third memory 11 of a type easy to be dismounted. A hard disk built in a camera body may be used as the third memory 11. The capacity of the fourth non-volatile memory 16 such as an EEPROM is generally smaller than that of a hard disk. If the address of a defective pixel of the image pickup element 3 is stored in a hard disk, data of more defective pixels can be interpolated. In this case, for the interpolation operation, the address of a defective pixel is read from the third memory 11 or hard disk by controlling it. If the third memory 11 of a type easy to be dismounted is used, a one-to-one correspondence between the image pickup element 3 of a camera and its defective pixel information can be readily provided.

If a pixel to be used for the interpolation is also defective, another pixel is used for the interpolation. In this case, after calculating the address of the pixel to be used for the interpolation at step S202, the calculated address is checked if it coincides with the address of the defective pixel read at step S201. If coincident, another proper pixel is selected and the address of the pixel to be used for the interpolation is again calculated.

Some image pickup element 3 produces a line scratch on an image. Such a line scratch becomes conspicuous when the gain of a signal processing circuitry is raised under a dark scene (a sensitivity up-state mode). In this case, the pattern of a line scratch is stored in a memory to allow the correction of image data during the sensitivity up-state mode. Namely, an image data taken during the sensitivity up-state mode is corrected by calculating the correction pattern using the stored line scratch pattern data, in the manner like the above-described correction of data of a defective pixel.

In the above embodiment, a camera having only a recording function is used by way of example. It is possible to reproduce a recorded image data on a CRT or printer. In such a case, data of a defective pixel or a scratch is allowed not to be corrected at the time of recording, but it is corrected at the later time when reproducing. If a hard disk difficult to be dismounted from the camera body is used, image data is read from the hard disk and reproduced on a CRT or printer, by using a buffer memory dedicated for the reproduction use and by using the data of a defective pixel or a scratch stored in the hard disk at an image pickup element area. The interpolation operation in this case is the same as described with FIG. 7.

If a memory card easy to be dismounted from the camera body is used, an image pickup element area is reserved in a memory card so as to provide information of each image recorded. In this case, the data in the image pickup element area is read when reproducing it, and corrected by using a memory dedicated for the reproduction use.

In the above embodiments, a still video camera is used. The present invention is not limited to still video cameras, but is applicable to general video cameras.

As described so far, according to the present invention, in interpolating data of a defective pixel of an image pickup element, data to be used for the interpolation can be selected freely from any pixel, independently from the order of reading pixels of the image pickup element. Furthermore, it is possible to interpolate data for a number of defective pixels. Therefore, even an image pickup element having a defective pixel can be used which otherwise has been discarded, reducing the cost of image pickup devices.

Next, a still further embodiment will be described. In this embodiment, an image signal for each pixel is accumulated until a motion of a subject is detected, and an average of the accumulated signals for each pixel is outputted, to thereby eliminate the adverse effects of light shot noises.

Figure 8:
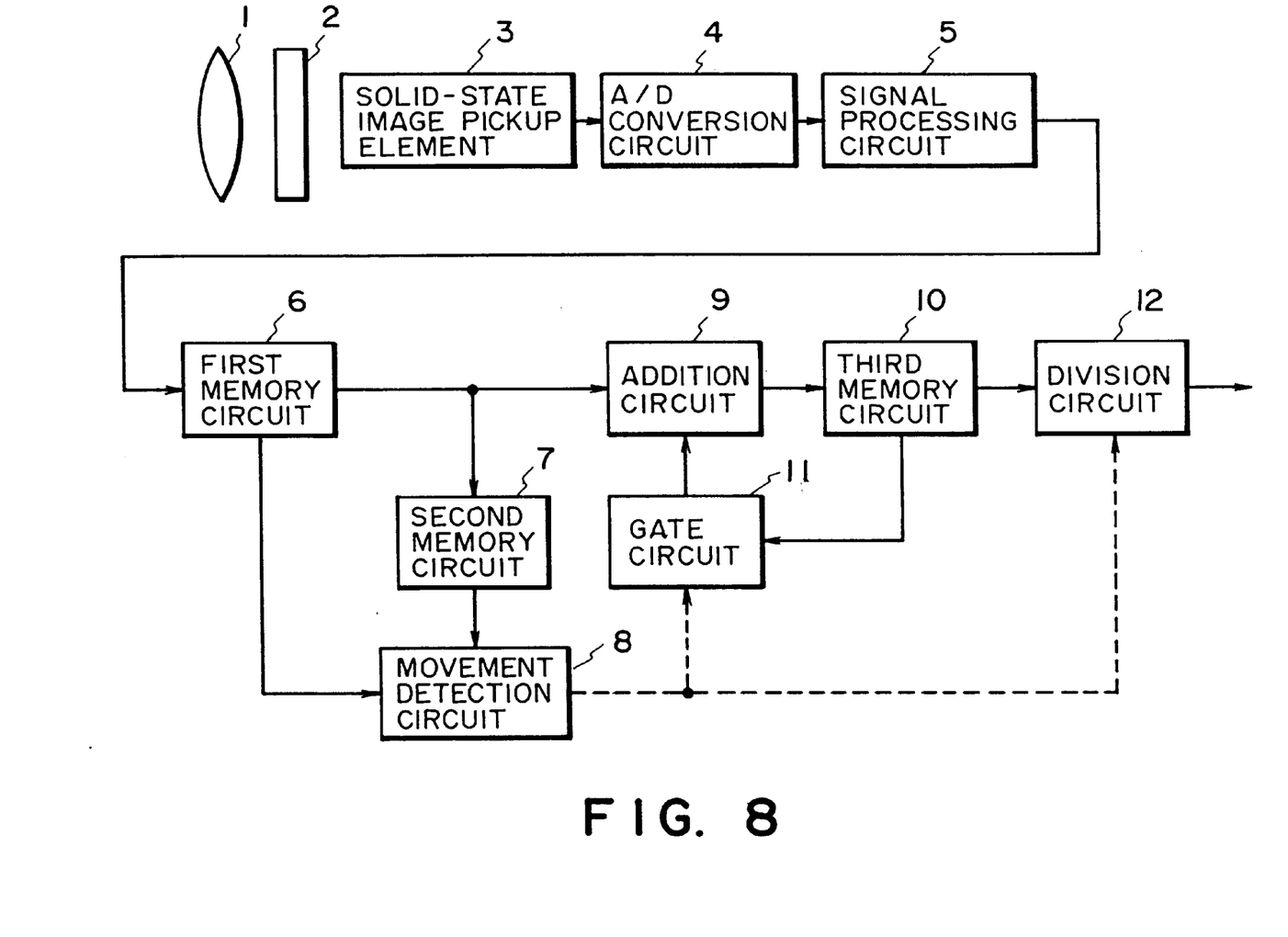
FIG. 8 is a block diagram showing an image pickup device of another embodiment according to the present invention.

FIG. 8 is a block diagram showing the system arrangement of this embodiment. In FIG. 8, light from a subject is incident upon a solid state image pickup element 3 such as a CCD via a lens 1 and iris stop 2. The image pickup device 3 is constructed of a plurality of pixels disposed in a matrix or offset form. An output of the image pickup device 3 is A/D converted by an A/D conversion circuit 4, and processed by a signal processing circuit 5. Reference numeral 6 represents a first memory circuit for storing an image data of one frame outputted from the signal processing circuit 5. Reference numeral 7 represents a second memory circuit for storing the image signal stored in the first memory and delayed by one frame. Reference numeral 8 represents a movement detection circuit for detecting a presence/absence of a motion of a subject, by comparing the image signals of two consecutive frames stored in the first and second memory circuits. Circuit elements 9, 10, and 11 are used for accumulating image data of frames. Reference numeral 9 represents an addition circuit, reference numeral 10 represents a third memory circuit for storing the image data of one frame outputted from the addition circuit, and reference numeral 11 represents a division circuit for dividing an output from the third memory by the number of accumulations. An output of the signal processing circuit 5 is stored in the first memory circuit 6, and then stored in the second memory 7 as the image signal one frame after the image signal stored in the first memory circuit 6. The image signals of two consecutive frames stored in the first memory circuit 6 and second memory circuit 7 are compared and checked by the movement detection circuit 8 whether there is a motion of the subject. Unless a motion is detected, the gate circuit 11 is made open so that the image data of one frame stored in the third memory circuit 10 is added to the image data of one frame stored in the first memory circuit. Unless a motion is detected by the movement detection circuit 8, the number of accumulations is incremented. The division circuit 12 divides the image data stored in the third memory 10 by the number of accumulations.

Figure 9:
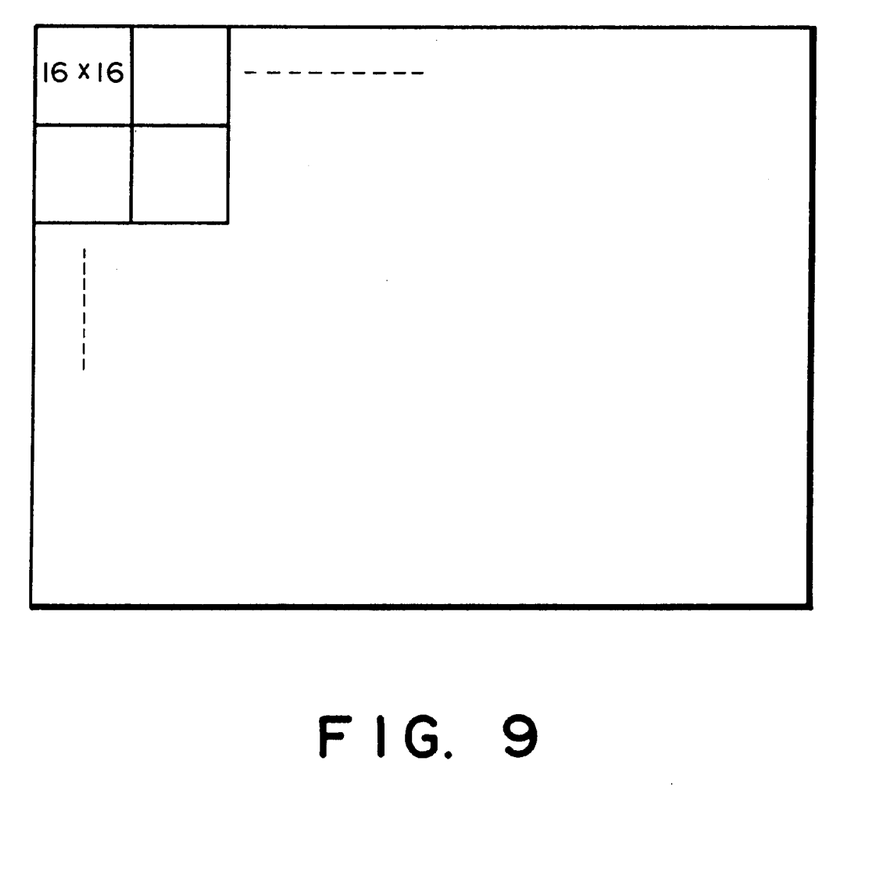
FIG. 9 is a diagram showing divided image blocks of one frame.

The operation of this embodiment will be described in detail. FIG. 9 shows an example of divided blocks of one frame image data. As seen from the example shown in FIG. 9, the image data of two consecutive frames stored in the first and second memory circuits 6 and 7 is divided into blocks each having 16*16 pixels in the vertical and horizontal directions, and the comparison by the movement detection circuit 8 is executed for each block.

Figure 10:
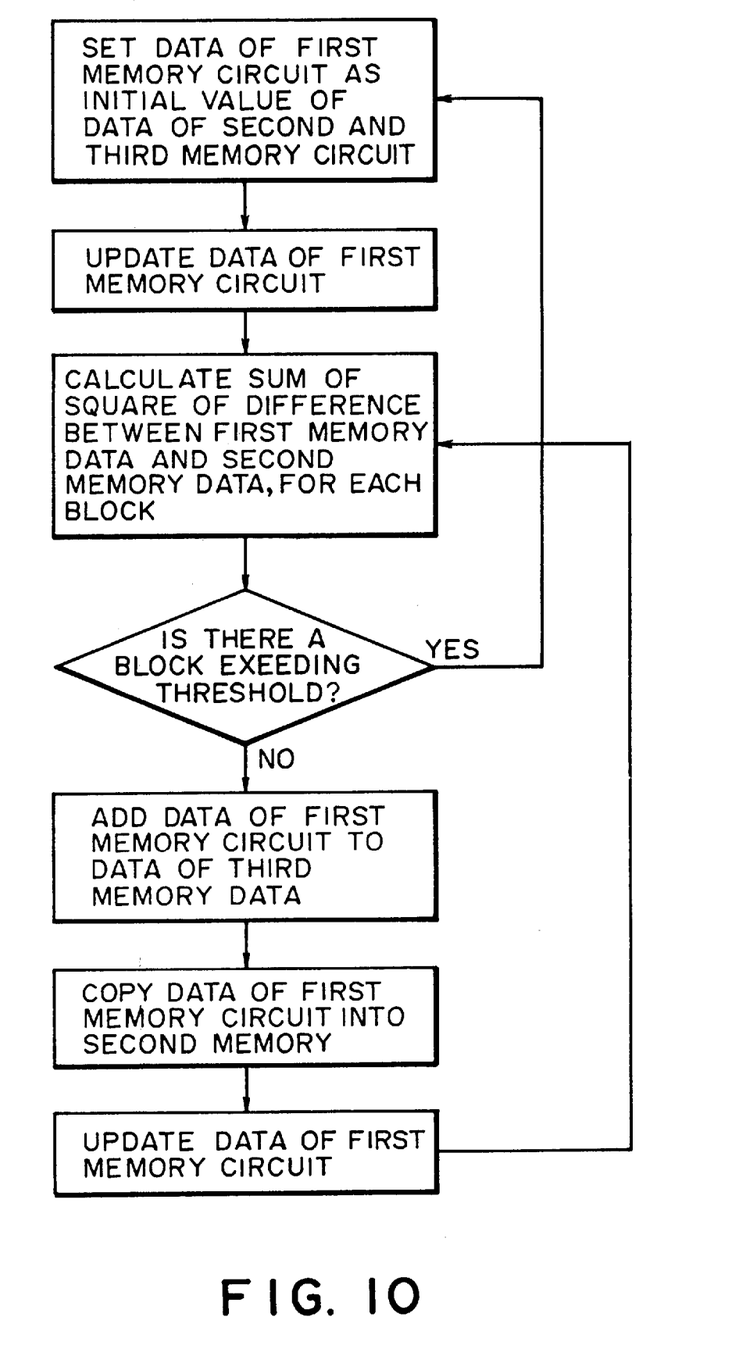
FIG. 10 is a flow chart illustrating the operation of the embodiment shown in FIG. 8.

FIG. 10 is a flow chart showing the operation of this embodiment. First, the image data stored in the first memory circuit 6 is stored in the second and third memory circuits 7 and 10 as their initial value. Thereafter, the contents of the first memory circuit 6 are updated. Next, a sum S of squares of differences between image data stored in the first and second memory circuits is calculated for each block. This sum is given by:

$$S = \sum_{i=0}^{15} \sum_{j=0}^{15} (x_{1ij} - x_{2ij})^2$$

where $x_{1ij}$ represents a pixel at the i-th row and at the j-th column within a block of the image data stored in the first memory circuit 6, and $x_{2ij}$ represents a pixel at the i-th row and at the j-th column within a block of the image data stored in the second memory circuit 7.

If there is a block whose sum S exceeds a predetermined threshold value, it is considered that the subject is moving. In this case, the gate circuit 11 is closed to stop the accumulation operation, the image data in the first memory circuit 6 is stored in the third memory circuit 10 as its initial value, and the number of accumulations is reset to 1. If there is no block whose sum S exceeds a predetermined threshold value, the gate circuit 11 is opened to add the image data stored in the first memory circuit 6 to the image data stored in the third memory circuit 10 to perform the accumulation operation. At the same time, the contents of the first memory circuit 6 are copied to the second memory circuit 7, and the contents of the first memory circuit 6 are updated. The number of accumulations are incremented by 1.

With the above-described operation, averaging image data after the accumulation is performed unless a motion of a subject is detected, thereby obtaining image signals with very small noises.

Figure 11:
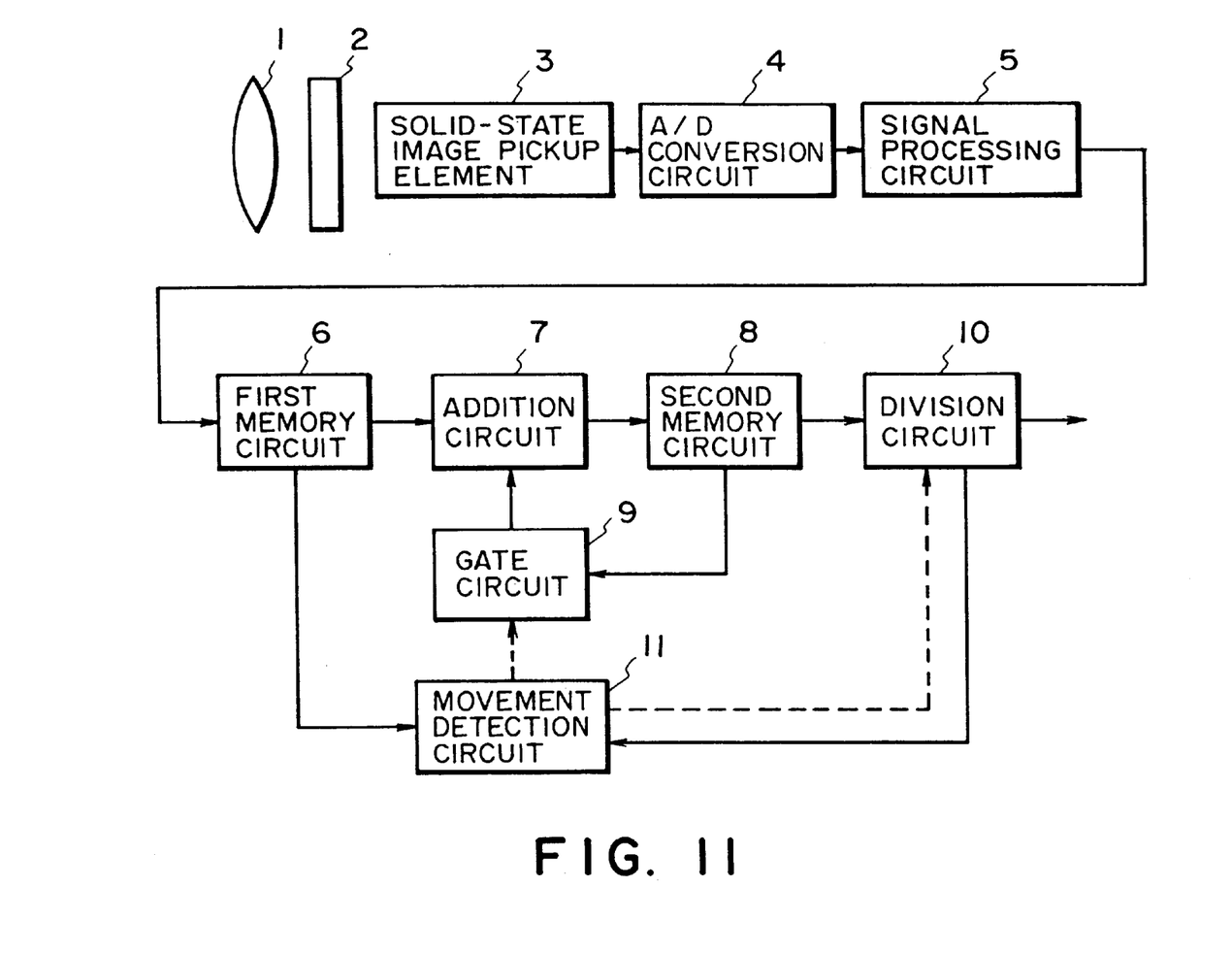
FIG. 11 is a block diagram showing an image pickup device of another embodiment according to the present invention.

FIG. 11 is a block diagram showing another embodiment of an image pickup device. In FIG. 11, reference numeral 6 represents a first memory circuit for storing an image data of one frame outputted from the signal processing circuit 5. Circuit elements 7, 8, and 9 are used for accumulating image data of frames. Reference numeral 7 represents an addition circuit, reference numeral 8 represents a second memory circuit for storing the image data of one frame outputted from the addition circuit, and reference numeral 9 represents a gate circuit for gating an output of the second memory circuit 8 to the addition circuit 7. Reference numeral 10 represents a division circuit for dividing an output of the second memory circuit 10 by the number of accumulations. Reference numeral 11 represents a movement detection circuit for detecting a presence/absence of a motion of a subject, by comparing the image signals of two consecutive frames stored in the first and second memory circuits 6 and 10.

Figure 12:
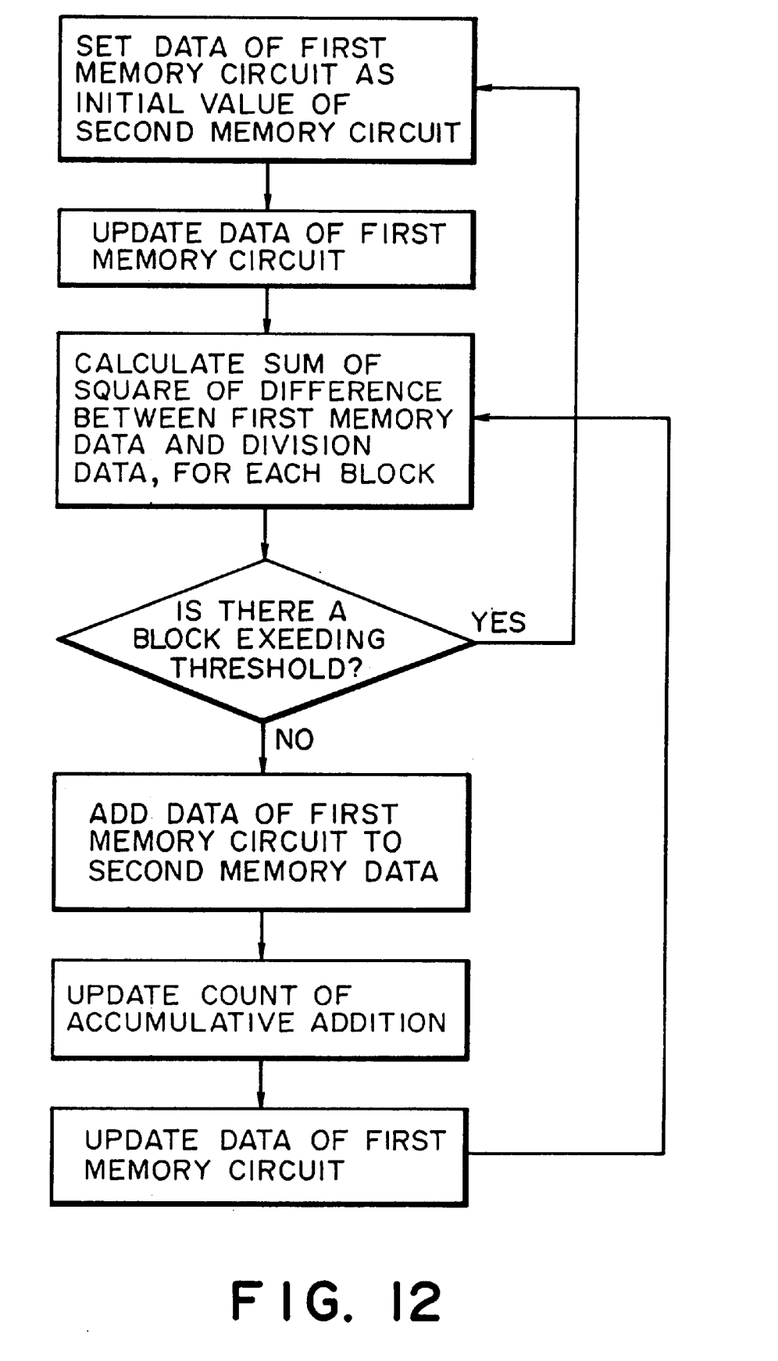
FIG. 12 is a flow chart illustrating the operation of the embodiment shown in FIG. 11.

FIG. 12 is a flow chart showing the operation of this embodiment. First, the image data stored in the first memory circuit 6 is stored in the second memory circuit 8 as its initial value. Thereafter, the contents of the first memory circuit 6 are updated. Next, a sum S of squares of differences between the image data stored in the first memory circuit 6 and the image data stored in the second memory circuit 8 and divided by the number of accumulations, is calculated for each block. This sum is calculated in the similar manner as described with the embodiment shown in FIG. 8. If there is a block whose sum S exceeds a predetermined threshold value, it is considered that the subject is moving. In this case, the gate circuit 9 is closed to stop the accumulation operation, the image data in the first memory circuit 6 is stored in the second memory circuit 8 as its initial value, and the number of accumulations is reset to 1. If there is no block whose sum S exceeds a predetermined threshold value, the gate circuit 9 is opened to add the image data stored in the first memory circuit 6 to the image data stored in the second memory circuit 8 to perform the accumulation operation. At the same time, the number of accumulations is incremented by 1, and the contents of the first memory circuit 6 are updated.

According to this embodiment, an image pickup element can be made compact, and automatic averaging is carried out for a stationary subject to reduce noises, thereby obtaining a good image quality even with an image pickup device having a poor S/N ratio. An image having a good S/N ratio can be obtained even with an image pickup element having a small charge saturation amount which element is hard to improve an S/N ratio by using a long exposure time and increasing the exposure charge amount. Furthermore, an image having a good S/N ratio can be obtained even under the illumination condition of an insufficient exposure amount. Still further, even if an iris stop is set to allow a large depth of field, an S/N ratio is not degraded making an image taking operation easy.

In the above embodiments, an output of an image pickup element is stored in memories and processed for each block having a plurality of pixels. Instead, an output of an image pickup element may be processed for each pixel stored in memories. Furthermore, the size of a block may be set as desired depending on the speed of motion of a subject, the number of moving subjects, and the like.

What is claimed is:

1. An image pickup device comprising:

image pickup means for receiving light from a subject and photoelectrically converting said received light;

exposure control means for controlling the amount of incident light to said image pickup means;

noise data generating means for generating noise data of said image pickup means, said noise data generating means generating said noise data by performing a predetermined processing on a plurality of noise signals obtained through a plurality of read operations by the same element of said image pickup means by shielding said image pickup device from light by said exposure control means;

detecting means for detecting a state of said image pickup means; and control means for controlling noise signal read-out times of said noise data generating means in accordance with the state of said image pickup means detected by said detecting means.

2. An image pickup device according to claim 1, wherein said detecting means detects a temperature of said image pickup means.

3. An image pickup device according to claim 1, wherein said detecting means detects a signal accumulation time of said image pickup means.

4. An image pickup device comprising:

a solid state image pickup element;

image pickup data generating means for generating image pickup data through an image pickup operation of reading data from said solid state image pickup element and A/D converting said data;

memory means for storing the image pickup data of an object image;

noise data generating means for generating noise data through the image pickup operation of reading data from said solid state image pickup element and A/D converting said data;

processing means for generating a desired image pickup data by subtracting an average data of a plurality of noise data obtained from the same element of the solid state image pickup element by a plurality of repetitive operations of said noise data generating means, from the image pickup data stored in said memory means;

detecting means for detecting a state of said solid state image pickup element; and control means for controlling repetitive operation times of said noise data generating means caused by said processing means, in accordance with the state of said solid state image pickup element detected by said detecting means.

5. An image pickup device according to claim 4, wherein said processing means generates said desired image pickup data by generating one integer-number-th of said noise data and subtracting said one integer-number-th of said noise data from said image pickup data stored in said memory means said integer-number times.

6. An image pickup device according to claim 4, wherein said detecting means detects a temperature of said solid state image pickup element.

7. An image pickup device according to claim 4, wherein said detecting means detects a signal accumulation time of said solid state image pickup element.

8. An image pickup device comprising:

image pickup means for receiving light from a subject and photoelectrically converting said received light;

noise data generating means for generating one N-th (N is an integer) of noise data stored in a memory, said noise data stored in said memory being obtained from the same element of said image pickup means by operating said image pickup means N times in a light-shielded state;

means for executing a calculation using an output of said image pickup means and an output of said noise data generating means;

detecting means for detecting a state of said image pickup means; and control means for setting a value of said N in accordance with the state of said image pickup means detecting by said detecting means.

9. An image pickup device according to claim 8, wherein said detecting means detects an environmental temperature of said image pickup means.

10. An image pickup device according to claim 8, wherein said detecting means detects an accumulation time of said image pickup means.

11. An image pickup device according to claim 7, wherein said image pickup means includes a CCD.

12. An image pickup apparatus, comprising:

(a) first signal generating means for generating a noise signal by image pickup means;

(b) second signal generating means for generating an image signal by said image pickup means;

(c) storage means for storing n times of the noise signal generated in the same element of said image pickup means;

(d) division means for dividing said n times of the noise signal stored in said storage means by n;

(e) operation means for operating the noise signal divided by said division means and said image signal outputted from said second signal generating means;

(f) detecting means for detecting a state of said image pickup means; and (g) control means for setting the number n in accordance with the state of said image pickup means detected by said detecting means.

13. An apparatus according to claim 12, wherein said first signal generating means and said second signal generating means include same image pickup means.

14. An apparatus according to claim 13, wherein the noise signal is generated by said first signal generating means when said image pickup means is shielded from the light.

15. An image pickup device, comprising:

image pickup means for receiving light from a subject and photoelectrically converting said received light;

noise data generating means for generating noise data of said image pickup means, said noise data generating means generating said noise data by performing a predetermined processing on a plurality of noise signals obtained through a plurality of read operations by the same element of said image pickup means in a state that said image pickup means does not receive light; and control means for controlling said noise data generating means to perform the plurality of read operations continuously.

16. An image pickup device according to claim 15, further comprising detecting means for detecting a temperature of said image pickup means, wherein said control means controls said noise data generating means in accordance with the temperature.

17. An image pickup device according to claim 15, further comprising detecting means for detecting a signal accumulation time of said image pickup means, wherein said control means controls said noise data generating means in accordance with the signal accumulation time.

18. An image pickup device according to claim 15, wherein said image pickup means includes a CCD.

19. An image pickup device according to claim 15, further comprising exposure control means for controlling the amount of incident light to said image pickup means.

20. An image pickup device comprising:

image pickup means for receiving light from a subject and photoelectrically converting said received light;

noise data generating means for generating one N-th (N is an integer) of noise data, said noise data being obtained from the same element of said image pickup means by operating said image pickup means N times in a state that said image pickup means does not receive light;

means for executing a calculation using an output of said image pickup means and an output of said noise data generating means; and control means for controlling said noise data generating means to store the N-th of noise data in a memory continuously.

21. An image pickup device according to claim 20, further comprising detecting means for detecting an environmental temperature of said image pickup means, wherein said control means controls said noise data generating means in accordance with the temperature.

22. An image pickup device according to clam 20, further comprising detecting means for detecting an accumulation time of said image pickup means, wherein said control means controls said noise data generating means in accordance with the signal accumulation time.

23. An image pickup device according to claim 20, wherein said image pickup means includes a CCD.

24. An image pickup device according to claim 20, further comprising exposure control means for controlling the amount of incident light to said image pickup means.

* * * * *

UNITED STATES PATENT AND TRADEMARK OFFICE
CERTIFICATE OF CORRECTION

PATENT NO. : 5,943,094                                            Page 1 of 1
DATED      : August 24, 1999
INVENTOR(S) : Shinji Sakai, et al.

It is certified that error appears in the above-identified patent and that said Letters Patent is hereby corrected as shown below:

Column 1,
Line 7, delete "Sep. 12, 1994," and insert -- Oct. 12, 1994, --.
Line 8, delete "Aug. 2, 1992," and insert -- Sep. 2, 1992 --.

Column 12,
Line 20, delete "claim 7," and insert -- claim 8, --.

Signed and Sealed this

Twenty-first Day of August, 2001

Attest:

*Nicholas P. Godici*

NICHOLAS P. GODICI
*Attesting Officer*    *Acting Director of the United States Patent and Trademark Office*